No. 860,957. PATENTED JULY 23, 1907.
J. I. ARBOGAST.
METHOD OF PRODUCING OPALESCENT GLASS.
APPLICATION FILED OCT. 9, 1906.
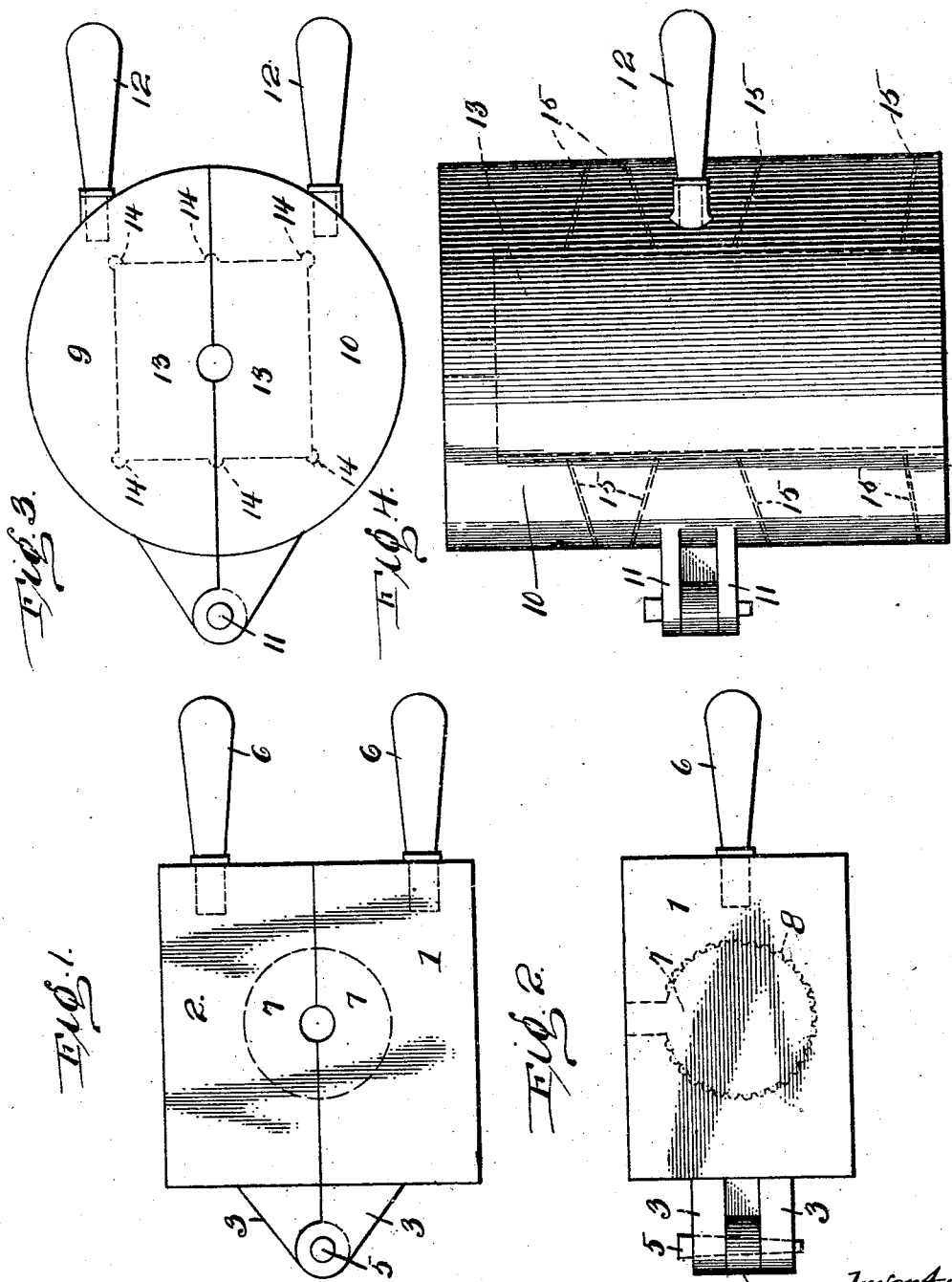

UNITED STATES PATENT OFFICE.

JOHN I. ARBOGAST, OF PITTSBURG, PENNSYLVANIA, ASSIGNOR OF ONE-HALF TO LEM S. BROCK, OF BEAVER, PENNSYLVANIA, SEVEN AND ONE-HALF ONE-HUNDREDTHS TO FRANK C. PARK, AND SEVEN AND ONE-HALF ONE-HUNDREDTHS TO HENRY L. COLLINS, BOTH OF PITTSBURG, PENNSYLVANIA.

METHOD OF PRODUCING OPALESCENT GLASS.

No. 860,957.      Specification of Letters Patent.      Patented July 23, 1907.

Application filed October 9, 1906. Serial No. 338,095.

*To all whom it may concern:*

Be it known that I, JOHN I. ARBOGAST, a citizen of the United States of America, residing at Pittsburg, in the county of Allegheny and State of Pennsylvania, have invented certain new and useful Improvements in Methods of Producing Opalescent Glass, of which the following is a specification, reference being had therein to the accompanying drawing.

This invention relates to methods of producing opalescent glass, and its primary object is to provide a novel method for manufacturing glass especially adapted for decorative purposes, in churches, auditoriums and buildings generally; and for the construction of ornamental glass articles of various kinds.

A further object of the invention is to provide a method for producing glass possessing distinctive qualities in appearance, particularly with respect to iridescence and prismatic effects.

The improved method will be fully described hereinafter in connection with the accompanying drawing which forms a part of this specification, and its novel features will be defined in the appended claims.

In the drawing, Figure 1 is a top plan view of a mold employed in the preliminary step of my improved method, Fig. 2 is a side elevation of the same, Fig. 3 is a top plan view of a mold for carrying out the final step of the improved method, and Fig. 4 is a side elevation of the same.

The "spot" mold shown in Figs. 1 and 2 comprises two separable sections 1 and 2 hinged together by overlapping lugs 3 and 4, and a tapering pivot 5, and each provided with a handle 6. The mold sections are formed with cavities 7 to receive the molten glass, and said cavities are formed with series of rows of recesses 8 to form projections on the glass blank. The mold shown in Figs. 3 and 4 also consists of two sections 9 and 10 hinged together as at 11, and provided with handle 12. Each of the mold sections is formed with a rectangular cavity 13, provided at each of its corners with a vertical recess or "blow-over" 14. It is obvious that when the two sections are closed together the two cavities 13 are united. A suitable number of air vents 15 are formed in the walls of the mold sections communicating with the mold cavity.

I will now describe the improved method as carried out by the aid of the two molds above described. The molten glass is blown in the spot mold to form a blank corresponding to the shape of the mold cavity. The blank is then removed and warmed up in the "glory hole", after which it is placed in the iron "open and shut" mold shown in Figs. 3 and 4, and blown therein. This step in the method divides the blank and flattens it against the four sides of the mold cavity filling the vertical recesses or "blow overs" thus connecting the flat plate of glass at each of those points by a very thin web or section of glass. The blowing of the blank against the walls of the mold flattens the projections or "spots" and transfers them from the outer surface of the blank to the inner surface thereof, and the several sections or plates of glass extending between the "blow overs" are readily separated thus producing a plurality of flat plates each ornamented by spots or figures corresponding in design to that of the recesses in the spot mold.

The spots or figures formed on the blank in the spot mold differ in color from the body of the blank, this being effected by having an excess of bone dust and arsenic in the glass mixture, and as the glass is thicker at the spots or figures than the body of the blank, the spots are more opaque and of a darker color than the remainder of the blank.

The transferring of the spots or figures from the outer to the inner surfaces of the divided blank produces flat plates having a highly iridescent polish or finish, thus adapting them for use in decorative work of various kinds and particularly for the interior decoration of churches and cathedrals. For churches where the stations of the cross are designated by illuminated iridescent decorative work the product of my improved method is specially well adapted, and the same will be useful for all purposes where a highly iridescent effect is desired.

What I claim and desire to secure by Letters Patent, is:—

1. The herein-described method of producing opalescent glass plates, consisting of forming a blank with surface projections in a figural mold, then "warming in" said blank, then blowing the same in a mold having a rectangular cavity and corner blow overs to divide the blank and flatten the same against the walls of the mold cavity to transfer the figures thereon from the outer to the inner surfaces of the divided blank, and to provide thin vertical connecting corner webs which break by the weight of the flattened plates.

2. The herein-described method of producing opalescent glass plates consisting of forming a blank with surface projections in a figural mold, then "warming in" said blank, then blowing the same in a mold having a rectangular cavity and vertical blow overs, to divide the blank and flatten the same against the walls of the mold cavity, to transfer the figures thereon from the outer to the inner surfaces of the divided blank and to form frangible connecting corner webs which permit the plates to fall apart.

In testimony whereof I affix my signature in the presence of two witnesses.

JOHN I. ARBOGAST.

Witnesses:
    MAX H. SROLOVITZ,
    A. J. TRIGG.